United States Patent
Kobayashi et al.

(10) Patent No.: US 8,747,787 B2
(45) Date of Patent: Jun. 10, 2014

(54) METHOD FOR PRODUCING RAW MATERIAL FOR FERRONICKEL SMELTING FROM LOW GRADE NICKEL OXIDE ORE

(75) Inventors: Hiroshi Kobayashi, Niihama (JP); Osamu Nakai, Tokyo (JP); Keisuke Shibayama, Tokyo (JP); Takayuki Nakai, Tokyo (JP); Yoshitomo Ozaki, Tokyo (JP); Norihisa Toki, Niihama (JP); Junichi Takahashi, Niihama (JP); Toshirou Tan, Niihama (JP)

(73) Assignee: Sumitomo Metal Mining Co., Ltd. (JP)

( * ) Notice: Subject to any disclaimer, the term of this patent is extended or adjusted under 35 U.S.C. 154(b) by 0 days.

(21) Appl. No.: 13/701,951

(22) PCT Filed: Jul. 13, 2011

(86) PCT No.: PCT/JP2011/066016
§ 371 (c)(1),
(2), (4) Date: Dec. 4, 2012

(87) PCT Pub. No.: WO2012/014685
PCT Pub. Date: Feb. 2, 2012

(65) Prior Publication Data
US 2013/0074653 A1 Mar. 28, 2013

(30) Foreign Application Priority Data
Jul. 28, 2010 (JP) ................. 2010-169845

(51) Int. Cl.
*C22B 23/00* (2006.01)

(52) U.S. Cl.
USPC ........................................ 423/139

(58) Field of Classification Search
USPC ........................................ 423/139
See application file for complete search history.

(56) References Cited

U.S. PATENT DOCUMENTS

| | | | |
|---|---|---|---|
| 6,428,604 | B1 | 8/2002 | Kerfoot et al. |
| 7,563,421 | B2 | 7/2009 | Kobayashi et al. |
| 7,935,171 | B2 | 5/2011 | Ratchev et al. |
| 2005/0211020 | A1 | 9/2005 | Sugitatsu et al. |
| 2011/0135547 | A1* | 6/2011 | Kobayashi et al. ........... 423/139 |

FOREIGN PATENT DOCUMENTS

| | | |
|---|---|---|
| AU | 725800 | 8/2000 |
| CN | 1352308 | 6/2002 |
| JP | 2000-234130 | 8/2000 |
| JP | 2004-509232 | 3/2004 |
| JP | 2004-156140 | 6/2004 |
| JP | 2005-350766 | 12/2005 |
| JP | 2006-241529 | 9/2006 |
| JP | 2007-77459 | 3/2007 |
| JP | 2008-231470 | 10/2008 |
| JP | 2009-46736 | 3/2009 |
| JP | 2009-97076 | 5/2009 |
| JP | 2010-501722 | 1/2010 |
| JP | 2010-284593 | 12/2010 |
| WO | 2010/143623 | 12/2010 |

OTHER PUBLICATIONS

International Search Report and Written Opinion of Oct. 11, 2011.

* cited by examiner

*Primary Examiner* — Steven Bos
(74) *Attorney, Agent, or Firm* — Gerald E. Hespos; Michael J. Porco; Matthew T. Hespos

(57) ABSTRACT

Provided is a method for producing ferronickel from a nickel sulfide or a mixed sulfide containing nickel and cobalt, obtained by hydrometallurgy of nickel oxide ore or obtained from scraps or products in process. The method for producing a ferronickel raw material is to form the ferronickel raw material from a nickel sulfide or a mixed sulfide containing nickel sulfide and cobalt sulfide, wherein treatments are performed through the following steps: (1) redissolution step, (2) deferrization step, (3) solvent extraction step, (4) hydroxylation step, (5) roasting step, and (6) washing and calcining step.

13 Claims, 5 Drawing Sheets

METHOD FOR PRODUCING RAW MATERIAL FOR FERRONICKEL SMELTING FROM LOW GRADE NICKEL OXIDE ORE

BACKGROUND OF THE INVENTION

1. Field of the Invention

The present invention is applicable in a field where nickel sulfide obtained from a low grade nickel oxide ore is used as a raw material for ferronickel smelting.

2. Description of the Related Art

Ferronickel, an alloy of nickel and iron, which is used as a raw material of stainless steel, or the like, is often produced by pyrometallurgy, in which a nickel oxide ore, such as laterite ore and garnierite ore, is introduced into a rotary kiln to be dried, and then introduced into a melting furnace, such as an electric furnace, with a reducing agent, such as coke, to be reduced and melted at a temperature of approximately 650 degrees C. In this case, a part of the oxide ore is dried in a kiln, and, without being reduced and melted, becomes a product as it is, as a nickel-iron mixed oxide in briquette form.

In recent years, high grade nickel oxide ores, such as garnierite ores, having not less than 2% nickel grade and having been conventionally used as raw materials, have been depleted, and accordingly there is a growing necessity to treat low grade nickel oxide ores, such as laterite ores, having approximately 1% to 2% or less nickel grade. However, when a nickel grade in an ore is low, a larger amount of ore needs to be treated in order to produce the same quantity of ferronickel and this causes scale-up of equipment. As a result, undesirable impacts, such as increase in investment related to production and increase in time and effort related to production, arise.

Furthermore, generally, nickel oxide ores often contain a lot of moisture, and therefore there was a problem that a quantity of fuel required for drying of nickel oxide ores by using a rotary kiln increases and accordingly cost increases. Hence, there has been conducted a study in which nickel in a low grade nickel oxide ore is condensed and reformed to a raw material having a high nickel grade, and the concentrated raw material is used to keep costs down.

For example, there is a method called HPAL as shown in Japanese Patent Application Laid-Open No. 2005-350766.

The method in Japanese Patent Application Laid-Open No. 2005-350766 is to provide a smelting method which is simple and efficient over a whole process, and achieved by simplification of a leaching step and a solid-liquid separation step, reduction of an amount of neutralizer consumption and an amount of precipitate in a neutralization step, and more efficient repeated use of water, in hydrometallurgy, which is based on high-temperature pressure leaching by to recover nickel from a nickel oxide ore.

Specifically, the smelting method comprises a leaching step, wherein sulfuric acid is added to a slurry of ore, followed by stirring treatment under a temperature of 220 to 280 degrees C. to form a leached slurry; a solid-liquid separation step, wherein multistage washing is performed for the leached slurry to obtain a leachate containing nickel and cobalt and a leaching residue; a neutralization step, wherein, while oxidation of the obtained leachate is controlled, calcium carbonate is added so that a pH is not more than 4, and thus a neutralized precipitate slurry containing trivalent iron and a mother liquor for recovering nickel are formed; and a sulfuration step, wherein hydrogen sulfide gas is blown into the mother liquor to form a sulfide containing nickel and cobalt, and a barren solution.

In other words, a nickel oxide ore is mixed with a sulfuric acid solution to be made into a slurry, then the slurry is heated in a high pressure vessel, such as an autoclave, and nickel and cobalt which are contained in the ore are leached into the sulfuric acid solution. Then, using a thickening apparatus, a filter press, or the like, the slurry is separated into a leachate and a residue. The obtained leachate is separated from impurities by pH adjustment, and a sulfurizing agent is added thereto to obtain a nickel-cobalt mixed sulfide.

The obtained mixed sulfide is transported to an existing hydrometallugical refining works, and leached using chlorine gas, sulfuric acid, or the like, and then cobalt is separated from nickel through steps, such as solvent extraction, and recovered as high-purity nickel metal and high-purity cobalt metal by a method, such as electrolytic winning.

Different from pyrometallurgy, which is a conventional common smelting method of nickel oxide ore, this method of Patent Literature 1 does not include dry type steps, such as a reduction step, a drying stage, etc., and use less energy, and thus is advantageous in terms of cost.

Furthermore, most of various kinds of impurities contained in nickel oxide ore, such as cobalt, iron, aluminum, manganese, zinc, chromium, magnesium, and silicon, other than nickel, were leached together with nickel from the ore by sulfuric acid, and therefore an important problem in a smelting process was separation and recovery of nickel by efficient means, but, by a neutralization step and a sulfuration step, the impurities can be effectively separated from nickel to obtain nickel sulfide and cobalt sulfide, each having less impurities. The method has been regarded as effective, for example, as a method for smelting a low grade nickel oxide ore with approximately 1 to 2% by mass nickel grade.

However, in Patent Literature 1, when the obtained sulfide is treated in the smelting works in which the above-mentioned oxide ore has been already treated, sulfur contained therein is oxidized, whereby a large amount of sulfur oxide (SOx) gas is emitted. Therefore, there is a problem that necessity to newly install equipment for exhaust gas treatment for sulfur oxide arises and a large amount of equipment investment is required.

Thus, it was not easy to smelt ferronickel from nickel sulfide.

Furthermore, Japanese Patent Application Laid-Open No. 2006-241529 (Page 1, Page 2, FIG. 1) describes a method comprising the steps of: obtaining a leachate containing nickel and cobalt by forming and fixing a residue by using iron contained in an ore as natron jarosite at the time of leaching by adding sulfuric acid to a nickel oxide ore in a upstream step; removing iron and aluminum by adding a neutralizer to the obtained leachate; obtaining an extracted residual solution containing nickel and a back-extraction solution containing cobalt, by treating the obtained neutralized solution by solvent extraction in which a monothiophosphinic acid compound is used as an extractant and thereby extracting cobalt; and obtaining a hydroxide by neutralizing each of the obtained extracted residual solution containing nickel and the obtained back-extraction solution containing cobalt, with alkali.

The obtained nickel hydroxide is washed using an alkali solution at a downstream step, whereby sulfur and chlorine each contained therein are removed, and then ferronickel is produced by a process including existing burning and reduction-dissolution steps.

However, when the method described in Japanese Patent Application Laid-Open No. 2006-241529 (Page 1, Page 2, FIG. 1) is used, the obtained nickel hydroxide often contains some sulfur resulting from involving sulfuric acid which is contained in the leachate. When burning and reduction-dissolution treatments are performed without removing the sulfur to produce nickel oxide, a problem that sulfur oxide generates arises, as is the case in the above-mentioned Japanese Patent Application Laid-Open No. 2005-350766.

It is difficult to remove the sulfur incidental to water of crystallization of the nickel hydroxide, only by washing in water, and therefore, as means to remove the sulfur incidental to the water of crystallization, Japanese Patent Application Laid-Open No. 2006-241529 (Page 1, Page 2, FIG. 1) describes a method for roasting nickel hydroxide at a temperature of approximately not less than 230 degrees C. to make nickel hydroxide and water of crystallization into sulfur and anhydrous nickel oxide.

However, even in the method of Japanese Patent Application Laid-Open No. 2006-241529 (Page 1, Page 2, FIG. 1), energy cost associated with the roasting at not less than 230 degrees C., and cost and time and effort necessary for treatment of exhaust gas cannot be ignored.

Furthermore, when a hydroxide is obtained by a hydrometallugical reaction as mentioned above, generally, fine particles are often formed, and when the fine particles are directly charged into a furnace in a downstream reduction melting step, hydroxide particles are dispersed or deposited on a wall of the furnace, whereby there is a concern that an operation trouble could arise or reaction efficiency could be not improved. Furthermore, the fine particles of nickel hydroxide tend to contain sulfur resulting from partially involving adhering water, water of crystallization, and the above-mentioned sulfuric acid solution before neutralization. When these hydrated particles are directly introduced into a high-temperature electric furnace, there are risks of causing a phreatic explosion due to water of crystallization and adhering water, generating corrosive gas by sulfur content and thereby promoting deterioration of equipment, or the like.

Therefore, in order to use nickel hydroxide as a raw material of ferronickel smelting, before reduction to ferronickel by an electric furnace, there is needed a complicated process requiring a treatment in which nickel hydroxide is introduced into a dry kiln for drying adhering water to be roasted and thereby changed into a nickel oxide, a treatment to remove sulfur before roasting, and the like. Thus, the production was costly.

In addition, most of nickel oxide ores often contain some cobalt accompanying nickel. The chemical property of cobalt is similar to that of nickel, and thus, when the method of Patent Literature 2 is used, cobalt contained in an ore coexists in nickel hydroxide without being separated from nickel. When this hydroxide is treated by an existing ferronickel producing process, cobalt is not recovered and losses are caused.

Japanese Patent Application Laid-Open No. 2007-77459 reports on a method for improving solid-liquid separation of a solid from a liquid each of which is generated by a neutralization step.

Specifically, the method comprises: a leaching step, wherein nickel or cobalt is leached from an oxide ore by using sulfuric acid to obtain a sulfuric acid leaching solution which contains nickel or cobalt, and a leaching residue; a reacting step, wherein pH adjustment is performed by reacting the sulfuric acid leaching solution containing the leaching residue with magnesium to obtain a reaction solution containing nickel or cobalt and a reaction residue containing iron; and a neutralization step, wherein the solution obtained in the upstream step is neutralized using a neutralizer to obtain a second neutralized solution containing nickel or cobalt and a second neutralized residue containing iron, and the method further comprises a preliminary neutralization step between the leaching step and the neutralization step, wherein a pH of the solution obtained at the upstream step is raised using an oxide ore.

However, according to the method of Japanese Patent Application Laid-Open No. 2007-77459, at a solvent extraction step in the latter stage using an organic solvent, nickel is maintained only at up to low concentration of approximately several g/L, therefore, a large amount of solution needs to be treated, whereby a scale of equipment is increased. Furthermore, since manganese contained in an oxide ore and existing in a leachate is extracted into an organic phase at the solvent extraction step, pH adjustment for separating manganese requires costs. Furthermore, there is a problem that an organic solvent accompanies a raffinate to cause losses, and cost increases accordingly, and thus the process is industrially disadvantageous.

As mentioned above, in the existing ferronickel smelting process, there has been required a method for producing nickel hydroxide which is effectively usable as a ferronickel raw material treatable by conventional methods.

At the same time, a method for effectively removing sulfur has been also needed.

An object of the present invention is to produce ferronickel from a nickel sulfide and a mixed sulfide containing nickel and cobalt, the nickel sulfide and the mixed sulfide being obtained by hydrometallurgy of nickel oxide ore or obtained from scraps and products in process.

SUMMARY OF THE INVENTION

A first aspect of the present invention to solve the above-mentioned problem provides a method for producing a ferronickel raw material, the method forming a ferronickel raw material from a nickel sulfide or a mixed sulfide containing nickel sulfide and cobalt sulfide, wherein treatments are performed through the following steps.

(1) A redissolution step, wherein a nickel sulfide or a mixed sulfide of nickel sulfide and cobalt sulfide is made into a slurry, and a oxidizing agent is added to the slurry to obtain a concentrate containing nickel when the nickel sulfide is dissolved, or to obtain a concentrate containing nickel and cobalt when the mixed sulfide is dissolved.

(2) A deferrization step, wherein alkali is added to the concentrate obtained in the redissolution step to obtain a neutralized precipitate and a post-neutralization solution.

(3) A solvent extraction step, wherein the post-neutralization solution obtained in the deferrization step is mixed with an organic extractant to separate into an extracted organic matter and a raffinate, and then a back-extraction solution and an organic matter after back extraction are obtained from the extracted organic matter.

(4) A hydroxylation step, wherein alkali is added to the raffinate obtained in the solvent extraction step and mixed to form a nickel hydroxide.

(5) A roasting step, wherein the nickel hydroxide obtained in the hydroxylation step is heated and roasted in a temperature range of not less than 230 degrees C. and not more than 870 degrees C. to form a nickel oxide.

(6) A washing and calcining step, wherein the nickel oxide obtained in the roasting step is water-washed using water with a water temperature of not less than 50 degrees C., and then calcined at a temperature of not less than 50 degrees C. to form a post-washing nickel oxide.

A second aspect of the present invention provides the method for producing ferronickel, wherein, in the first aspect, a particle size of the nickel sulfide or the mixed sulfide, before being mixed with an oxidizing agent, is in a range of 15 to 100 μm in mean volume diameter (MV).

A third aspect of the present invention provides the method for producing ferronickel, wherein, in the redissolution step of the first aspect, the redissolution is performed in a temperature range of not less than 60 degrees C. and not more than 160 degrees C.

A fourth aspect of the present invention provides the method for producing ferronickel, wherein, in the redissolution step of the first aspect, the oxidizing agent to be added is at least any one kind of air, oxygen, a hydrogen peroxide solution, and ozone gas.

A fifth aspect of the present invention provides the method for producing ferronickel, wherein, in the roasting step of the first aspect, the roasting is performed under an inert atmosphere or an oxygen partial pressure inside a reaction vessel of not more than 10-8 atm.

A sixth aspect of the present invention provides the method for producing ferronickel, wherein, in the solvent extraction step of the first aspect, a sulfurizing agent is added to the obtained back-extraction solution to obtain cobalt sulfide.

A seventh aspect of the present invention is the method for producing ferronickel, wherein, in the solvent extraction step of the first aspect, soda ash is added to the obtained back-extraction solution to obtain a cobalt carbonate.

An eighth aspect of the present invention provides the method for producing ferronickel, wherein, in the solvent extraction step of the first aspect, alkali is added to the obtained back-extraction solution to obtain cobalt hydroxide.

A ninth aspect of the present invention provides the method for producing ferronickel, wherein a reducing agent and a binder in an amount of 0.1 to 8% by weight with respect to the post-washing nickel oxide obtained in the first aspect are added to the post-washing nickel oxide, and kneaded, followed by calcining at a temperature of not less than 50 degrees C. to obtain a nickel oxide pellet.

A tenth aspect of the present invention provides the method for producing ferronickel, wherein, in the ninth aspect, the reducing agent is at least one kind of fine coal, powdered coal, and coke breeze.

A eleventh aspect of the present invention provides the method for producing ferronickel, wherein, in the ninth aspect, the binder is at least any one kind of bentonite and low grade nickel oxide ore.

A twelfth aspect of the present invention provides the method for producing ferronickel, wherein the nickel sulfide or the mixed sulfide containing nickel sulfide and cobalt sulfide in the first aspect is a nickel sulfide or a mixed sulfide containing nickel sulfide and cobalt sulfide, each being obtained in such manner that a leachate which is obtained by solid-liquid separation after high-temperature pressure leaching of a nickel oxide ore by using sulfuric acid is neutralized to be separated into a precipitate containing impurities, and a filtrate, and then a sulfurizing agent is added to the filtrate to separate a zinc sulfide precipitate, followed by blowing a sulfurizing agent into a filtrate after the separation.

A thirteenth aspect of the present invention provides the method for producing ferronickel, wherein the nickel sulfide or the mixed sulfide containing nickel sulfide and cobalt sulfide, each being used in the first aspect, is a nickel sulfide or a mixed sulfide containing nickel sulfide and cobalt sulfide, each being formed in such manner that a leachate is produced using sulfuric acid by leaching at least one kind from nickel hydroxide, nickel oxide, cobalt hydroxide, and cobalt oxide, each of which is generated as a scrap or a product in process, followed by blowing a sulfurizing agent into the leachate.

According to the method for producing a ferronickel smelting raw material in the present invention, the following industrially remarkable effects are exhibited.

(1) A low grade nickel oxide ore is usable as a raw material for ferronickel production.

(2) A ferronickel raw material is capable of being directly introduced into an electric furnace, whereby a treatment in a rotary kiln is omissible.

(3) A briquette with high strength is obtainable.

(4) Cost and energy necessary for ferronickel smelting are capable being reduced.

(5) Existing equipment for ferronickel smelting is usable as it is.

(6) A mixed sulfide containing cobalt is usable as a raw material of ferronickel.

(7) A sulfide obtained from a nickel oxide ore is capable of being properly used and supplied as an intermediate material of nickel or cobalt for different uses.

(8) Loss of cobalt is capable of being prevented.

(9) Ferronickel is producible from nickel hydroxide with a high sulfur content.

DETAILED DESCRIPTION OF THE PREFERRED EMBODIMENTS

The present invention relates to a method for producing ferronickel from a nickel sulfide or a mixed sulfide comprising nickel and cobalt (hereinafter, referred to as a nickel sulfide or the like), wherein nickel is leached from a nickel sulfide or the like into a solution and separated from impurities contained therein, and furthermore separated from cobalt by solvent extraction, and then, made into a nickel hydroxide by alkali, again. Next, the nickel hydroxide is roasted to be made into a nickel oxide, and separated from sulfur by washing and calcining, and then reduced and melted as it is to obtain ferronickel.

Figure 1:
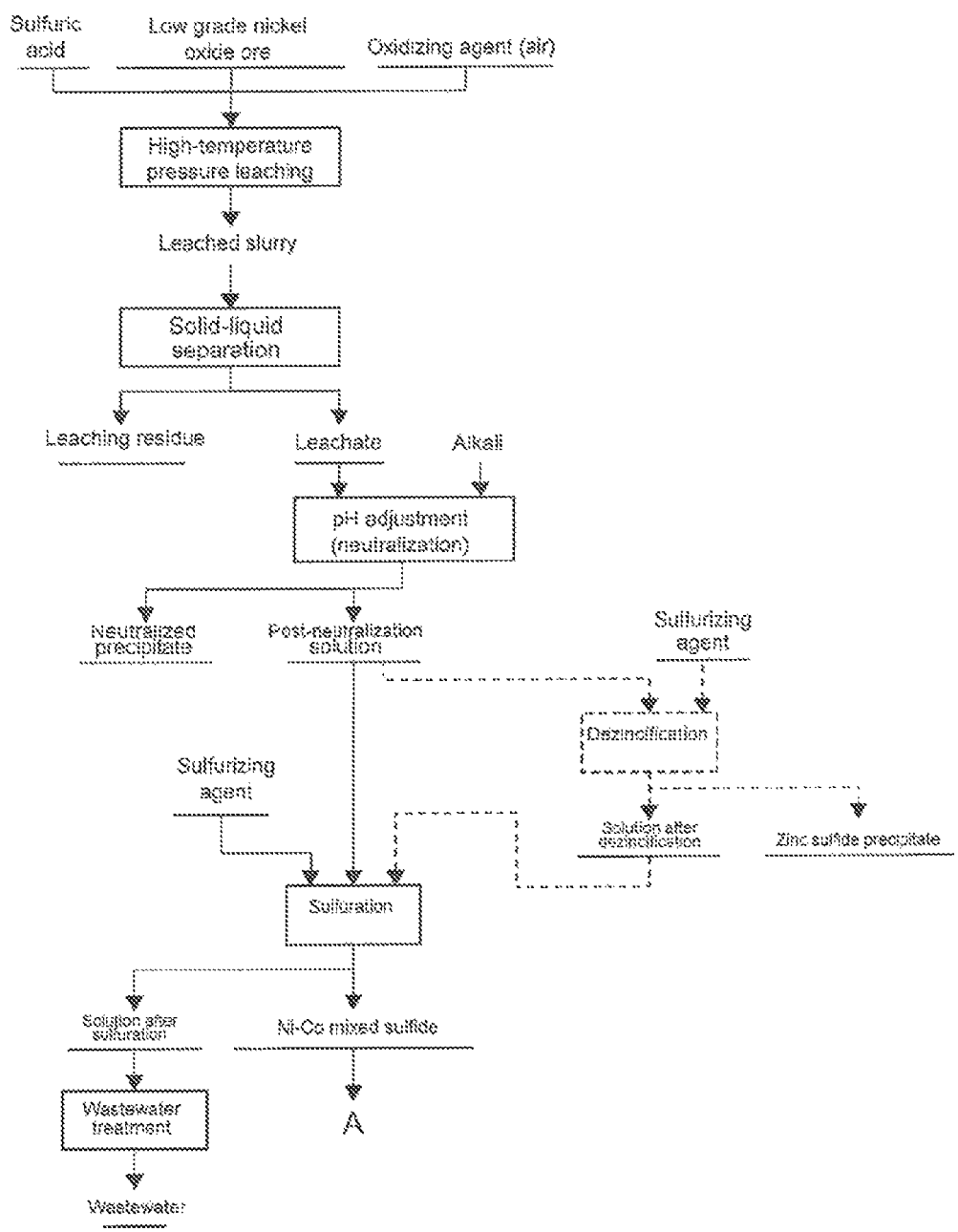
FIG. 1 illustrates a process for producing a nickel-cobalt mixed sulfide from a nickel oxide ore, the mixed sulfide being a raw material used for the method for producing ferronickel of the present invention.

As the nickel sulfide, the nickel-cobalt mixed sulfide, or the like, each being used in the present invention, usable is, for example, a nickel sulfide or the like, manufactured by the production process shown in FIG. 1 in such manner that an oxide ore containing nickel and cobalt, such as an laterite ore, is charged into a high-pressure vessel, such as an autoclave, with sulfuric acid to leach nickel in the ore, followed by treatments, such as solid-liquid separation, pH adjustment, dezincification, and then sulfuration treatment is performed.

Note that also usable is a nickel matte or the like, obtained by sulfuration-roasting a nickel oxide using an electric furnace.

A method relates to a nickel-cobalt mixed sulfide obtained by a fixed operation, the method for recovering nickel as a hydroxide through re-leaching by an oxidizing agent and separating nickel from cobalt by a solvent extraction operation, wherein the following steps are performed in order.

Hereinafter, each of the steps will be explained using accompanying drawings.

[Redissolution Step]

A nickel sulfide or the like usually contains cobalt, which is valuable, and various impurity components, such as aluminum, magnesium, manganese, iron, and chromium, besides nickel which is a target to be recovered.

Figure 2:
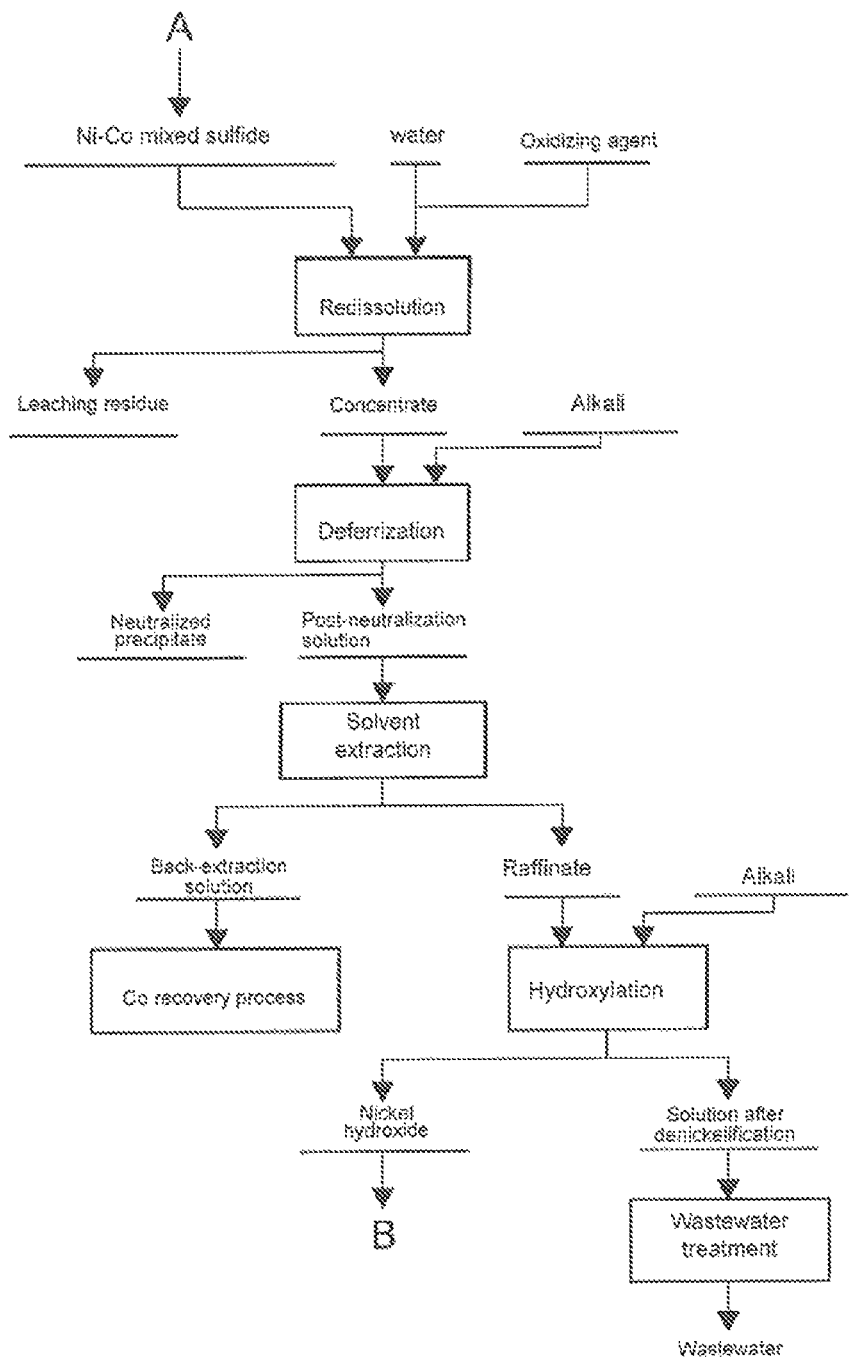
FIG. 2 illustrates a production process in the present invention for forming nickel hydroxide from a nickel-cobalt sulfide, the production process comprising "redissolution step", "deferrization step", "solvent extraction step" and "hydroxylation step", in the present invention, and being a process until nickel hydroxide is formed.

Therefore, in order to separate these, as shown in FIG. 2, water containing no impurity is added to a nickel sulfide or the like, which is a starting material, to make a slurry.

A concentration of the slurry is preferably selected so that a concentrate to be obtained by redissolution is not supersaturated. Specifically, in view of scaling and blockage troubles caused by crystal precipitation of nickel sulfate inside an industrial vessel for leaching reaction and an industrial pipe for fluid transportation, the slurry concentration is preferably controlled in a range of 10 to 40% by weight, more preferably 15 to 25% by weight.

Note that a particle size of a sulfide or a mixed sulfide to be used is in a range of 15 to 100 μm, preferably 20 to 40 μm, which are values obtained by measurement by micro-track and expressed in mean volume diameter (MV). When a particle size of the mixed sulfide to be treated is larger than the specified range, the particle diameter may be adjusted by crushing by a crusher. On the contrary, when the particle size is smaller than the specified range, it is preferable that the particle diameter is enlarged for use by repeating a sulfide producing process as a seed crystal.

Next, an oxidizing agent is added to the obtained slurry to redissolve and leach the nickel sulfide or the like into a solution. Here the leaching reaction is performed according to the following chemical formula 1.

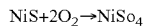
[Chemical formula 1]

As the oxidizing agent to be used, air or the like is usable.

When a solution temperature in a reaction vessel is set to be not less than 60 degrees C. and high concentration oxygen, oxygenated water, or ozone is used as an oxidizing agent, oxidation is promoted, whereby operation can be performed with compact equipment. Furthermore, pressure reaction by using a well-closed vessel, such as an autoclave, is also effective in promoting reaction.

After the redissolution, solid-liquid separation is performed using means, such as a filter press, to separate a concentrate from a leaching residue. The separated leaching residue is returned to a pre-redissolution slurry to repeatedly pass through the redissolution step.

[Deferrization Step]

Alkali is added to the concentrate containing nickel and cobalt, which has been obtained by the redissolution step, to neutralize and solid-liquid separate the concentrate, whereby a neutralized precipitate and a post-neutralization solution are formed. Iron in the concentrate is distributed to the neutralized precipitate.

[Solvent Extraction Step]

The post-neutralization solution containing nickel and cobalt, which has been obtained by the deferrization step, is solvent-extracted to separate nickel from cobalt.

Specifically, the post-neutralization solution is used as an aqueous phase and mixed with an organic phase comprising an organic solvent containing a phosphoric ester acid extractant, and alkali is further added thereto to adjust pH, whereby cobalt is extracted into an organic phase. Then, the aqueous phase is separated from the organic phase, and dilute acid is added to the obtained organic phase to back-extract the nickel, which has been extracted in the previous stage, into the aqueous phase, then followed by a washing stage to separate both of the phases and a back-extraction stage to back-extract the cobalt, which has been extracted into the organic phase, into the aqueous phase by adding dilute acid and then separate both of the phases. Here, most of the nickel remains in a raffinate.

The phosphoric ester acid extractant to be used is not particularly limited, and what well-separates nickel and cobalt is usable.

The pH adjustment in the solvent extraction stage may be easily performed using an aqueous solution containing an alkaline agent, such as sodium hydroxide.

Here, an equilibrium pH of the aqueous phase is preferably maintained at approximately 5. Note that appropriate setting of a volume ratio of the organic phase to the aqueous and the number of extraction stages enable not less than 98% of cobalt contained in the concentrate to be extracted. Furthermore, in the back-extraction stage, cobalt extracted into the organic phase is back-extracted as a sulfate, and usable as it is, as a raw material of cobalt sulfate, cobalt oxide, cobalt hydroxide or the like.

[Hydroxylation Step]

Alkali is added to the raffinate obtained by the solvent extraction step to adjust pH, whereby a precipitate of nickel hydroxide is obtained. Nickel in the raffinate is formed into nickel hydroxide, and accordingly solid-liquid separation is performed by filtering to recover the nickel hydroxide. The nickel grade in the obtained nickel hydroxide is 35 to 45% by weight.

In the hydroxylation step, pH of the raffinate is preferably adjusted in a range of 6.5 to 8.0. If the pH is less than 6.5, efficiency falls in such manner that a part of nickel hydroxide redissolves and thus becomes a loss. On the other hand, if the pH is more than 8.0, efficiency falls in such manner that, without improving a yield of nickel hydroxide to be obtained, only consumption of alkali increases.

In this step, various kinds of alkalis may be used as alkali to be added.

However, for example, it is not preferable to use slaked lime because gypsum forms and precipitates and then is mixed into the precipitate, whereby a nickel grade may be reduced. Magnesium hydroxide and sodium hydroxide are suitably used.

A reaction temperature is preferably not less than 60 degrees C., and, in view of stability at the time of the reaction, not less than a boiling point.

For filtration, existing kinds of tools, such as a filter press, a Buchner funnel, a Denver filter, and a centrifugal separator, may be used.

Figure 3:
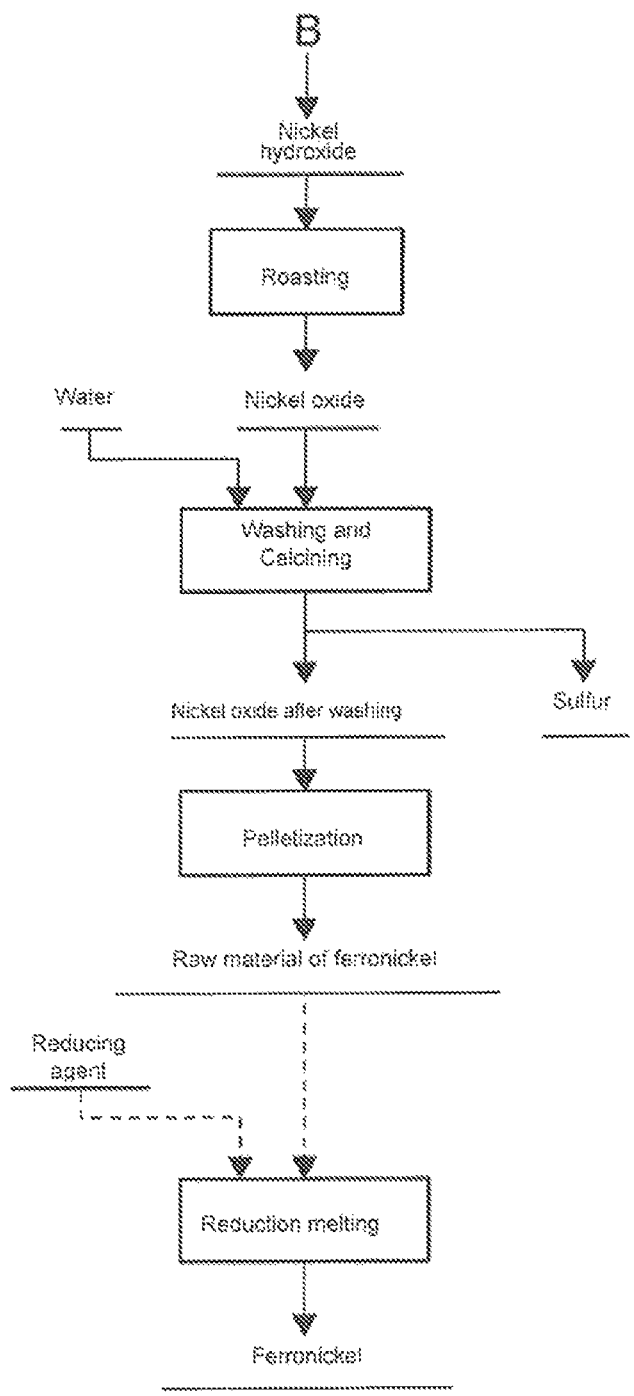
FIG. 3 illustrates a production process for forming ferronickel from nickel hydroxide, the production process comprising "roasting step" and "washing and calcining step" of nickel hydroxide, and being a process until ferronickel is formed.

Next, the nickel hydroxide obtained by the hydroxylation step is made into ferronickel through "roasting step" and "washing and calcining step", as shown in FIG. 3.

[Roasting Step]

The nickel hydroxide obtained by the hydroxylation step is formed into a nickel oxide by a roasting step.

The roasting is performed under conditions of a temperature range of not less than 230 degrees C. and not more than 870 degrees C., preferably not less than 600 degrees C. and not more than 750 degrees C., and an inert or reducing atmosphere.

In the roasting step, it is considered that, when sulfur which contaminates nickel hydroxide is contained as adhering water of the nickel hydroxide, the sulfur is easily removable by water-washing, meanwhile, sulfur attached to water of crystallization included in nickel hydroxide exists in a state of being incorporated into a crystal structure of the nickel hydroxide, and thus difficult to be removed only by water-washing. Therefore, a method was used, wherein the nickel hydroxide was roasted to decompose the water of crystallization and be changed into a nickel oxide, thereby reformed so that sulfur would not be incorporated into the crystal.

As for a roasting temperature, it is effective to perform the roasting at a temperature higher than a temperature at which water of crystallization decomposes. In the case of nickel hydroxide, specifically, a temperature of not less than approximately 230 degrees C. is effective.

Note that even if roasting is performed at a temperature of around 230 degrees C. or lower at which water of crystallization adhered to nickel hydroxide decomposes, and then water washing is performed, removal of sulfur is insufficient. This is considered because sulfur in nickel hydroxide not exists in a form of simple sulfate but has a form of complicated salt.

Therefore, it is effective that roasting is performed at a temperature higher than a decomposition temperature of nickel sulfate to change a complicated salt into a form of a water-soluble simple salt, then sulfur is removed.

Since almost 100% of sulfur oxidizes and volatilizes at a temperature of 870 degrees C., roasting which is performed at a temperature exceeding that temperature just wastes energy and is ineffective.

When the roasting temperature is somewhat high, powders of nickel oxide are lightly sintered together, whereby an effect on controlling scattering of impalpable powder is achieved, but, at an excessively high temperature, uneven and massive solids are formed, whereby there could be an impact on handling and washing of a downstream step.

Therefore, in view of handling in actual operation, and of reaction rate and thermal efficiency of actual oxidation reaction, the roasting temperature is preferably in a rage of not less than 600 degrees C. and not more than 750 degrees C.

For roasting, existing equipment, such as a kiln, a fluidized bed kiln, and a tubular furnace, may be used.

When roasting is performed in the presence of oxygen, such as in the air, sulfate which is formed of adhering sulfur decomposes and sulfur volatilizes as sulfur oxide (SOx) gas. The sulfur oxide which has volatilized needs equipment for waste gas treatment to be recovered and rendered harmless, and cost increases accordingly. Therefore, it is preferable that roasting is performed under a non-oxidizing atmosphere, such as inert or reducing atmosphere, to prevent sulfur oxide from being formed.

A concentration of oxygen which remains in an atmosphere is not generally specified partly due to a relation with a partial pressure of sulfur oxide (SOx), but, generally, is preferably set to a partial pressure lower than 10-8 atm.

[Washing and Calcining Step]

The nickel oxide obtained by the roasting step is water-washed, and then calcined to separate sulfur which remains on the surface. At this time, when a reducing agent is added, a pellet is capable of being formed using moisture which remains on the surface of the nickel oxide, and thus reactivity at the time of reduction is further improved.

Specifically, first, the nickel oxide is washed by warm water of not less than 50 degrees C. Next, the nickel oxide is calcined to separate moisture. A series of these steps is performed.

Means to calcine the nickel oxide is not generally specified since optimal types and forms change depending on calcining equipment, waste gas lines, or the like, and it is enough that heat propagation is sufficiently performed and calcining time is sufficiently secured for volatilization of moisture or decomposition of remaining hydroxide. A heat source may not be limited to waste gas generating at the time of the roasting, but may be any one which is usable.

When nickel hydroxide is roasted in an inert or reducing atmosphere, sulfur remains on the surface of nickel oxide in a form of sulfate. Water-washing after roasting enables sulfate, which is soluble, to be effectively separated from nickel oxide, which is insoluble.

A temperature of washing water in that case is preferably set in a range of not less than 50 degrees C. and not more than 100 degrees C.

Several percent up to around more than 20% of adhering water remains on the surface of post-washing nickel oxide which has been obtained after sulfur is removed by water-washing after roasting. A certain degree of the remaining adhering water is removable, for example, by spraying air with air blow or decaying with Denver.

There are problems with fine powders of nickel oxide, such as easy dispersion thereof inside a furnace or in the handling, and easy adhesion thereof to a furnace wall to cause operation troubles.

Therefore, in the present invention, a method of pelletizing nickel oxide and then putting into a reduction furnace was applied. Pelletizing is carried out in such manner that nickel oxide powders are charged into a kneader or a disc-shaped pelletizer and kneaded with adding a specified concentration of moisture, whereby a granular pellet is obtained.

At this time, a lack of moisture leads to insufficient bonding strength of the powders at the time of kneading, and thus a granular pellet is difficult to be obtained. However, according to the present invention, a pellet with sufficient strength is obtained by using moisture which remains on the surface of nickel oxide obtained after roasting and washing nickel hydroxide to separate from sulfur.

On the contrary, too much moisture makes the powders into a slurry, thereby preventing a pellet from being formed. In this case, dehydration is performed using air blow or Denver and furthermore calcining is carried out at a lower temperature, which makes it possible to adjust moisture percentage.

Generally, in order to remove moisture by calcining nickel oxide, if a calcining temperature is not less than 50 degrees C., most of adhering water, other than moisture necessary for pelletization, is removable, but, if a calcining temperature is not less than 100 degrees C., adhering water is completely removed, which is not preferable as calcining before pelletization. Note that, in the case where hydroxide partially remains after forming a pellet, calcining at a temperature of not less than 240 degrees C. enables complete dehydration to be achieved. For these calcining, waste gas generated at the above-mentioned roasting step is reusable.

In addition, at the time of pelletizing, a reducing agent is mixed and furthermore a binder, such as bentonite, is mixed, whereby much better bonding strength is achieved and, at the same time, nickel oxide particles and the reducing agent are located close, and thus reduction from nickel oxide to ferronickel inside an electric furnace in a next step efficiently and stably proceeds.

Coal dust, coke breeze, or the like may be used as the reducing agent.

A particle size of the reducing agent is preferably equivalent to that of nickel oxide powders. In order to obtain a pellet with strength, the pellet preferably contains argillaceous components, but nickel oxide and the reducing agent to be added hardly contain argillaceous components and thus there is a limit to strength to be obtained. Therefore, a compression kneader, which easily generates bonding strength, is preferably used for pelletization.

It is also effective to add low grade nickel oxide ore, bentonite, or the like as a binder.

An adding amount of the binder is not generally specified by the kind of the binder, but determined by suitably comparing an adding amount with strength to be obtained. For example, when bentonite is used, sufficient strength is obtained by adding bentonite with an amount equivalent to approximately 0.1 to 8% by weight of nickel oxide amount.

EXAMPLE

Hereinafter, the present invention will be explained using Example.

Example 1

[Production of Sulfide]

First, according to a production process for producing sulfide from a nickel oxide ore in FIG. 1, 500 g of laterite ore having a component composition of Ni: 1.1% by mass, Co: 0.1% by mass, Fe: 42.0% by mass, Mn: 0.8% by mass, and Al: 2.7% by mass was measured by dry weight and collected, then placed in a heat-resistant vessel with a capacity of 3 liters, and 150 g of sulfuric acid solution having a 64% by mass concentration and water were added thereto to adjust so that a slurry concentration became 30% by mass.

The heat-resistant vessel in which the slurry was placed was charged into an electric-heating type autoclave with an internal volume of 3.5 liters, and covered with a lid, and, with being stirred by a stirrer, heated so that an internal temperature reached 245 degrees C. After the state was kept for 1 hour, with the stirring being continued, the heating was stopped to perform natural-cooling to room temperature. After the cooling to room temperature, the autoclave was opened to take out a leached slurry.

The above-mentioned leached slurry was solid-liquid separated using a Buchner funnel and a 5C filter paper to separate a leachate from a leaching residue, the leachate having a composition of Ni: 6.0 g/L, Co: 0.4 g/L, Fe: 3.5 g/L, Al: 4.1 g/L, and Mn: 4.5 g/L.

Next, a calcium carbonate slurry having a 20% by mass concentration was added to the leached slurry to adjust pH to 2.5 and thereby neutralize remaining sulfuric acid, and then solid-liquid separation and residue washing were carried out. Then, calcium carbonate is further added to adjust pH to 3.2 and perform neutralization, followed by separation into a neutralized precipitate and a post-neutralization solution.

Next, 30 liters of the obtained post-neutralization solution was maintained at 60 to 90 degrees C. and at a pressure of 100 to 350 kPa, and hydrogen sulfide gas was blown thereinto from a cylinder via a blow pipe at a flow rate of 1.0 liter per minute.

After blowing a predetermined amount, which is a reaction equivalent amount, of hydrogen sulfide gas, the state was maintained for 1 hour.

After the time elapsed, solid-liquid separation was performed to separate a sulfide precipitate, i.e., a nickel-cobalt mixed sulfide from a post-sulfurization solution.

[Leaching of Nickel-Cobalt Mixed Sulfide: Redissolution]

Next, a 200 dry-g aliquot of the obtained nickel-cobalt mixed sulfide (Composition: Ni 57.0 wt %, Co 4.5 wt %, and Mn 0.01 wt %) was taken, and 2 liters of pure water was added thereto to adjust so that a solid concentration (slurry concentration) became 9.1 wt %, whereby a mixed sulfide slurry was produced.

The mixed sulfide slurry was charged into an autoclave apparatus and the temperature was raised to 120 degrees C. While stirring was performed at 400 rpm with the temperature being maintained, pure oxygen was blown into from a cylinder at a flow rate of 30 ml per minute for 5 hours to perform a leaching reaction and redissolution.

After completing the predetermined reaction, a leached slurry was taken out from the autoclave, and filtered by a Buchner funnel to separate into a nickel-cobalt concentrate and a leaching residue.

Next, sodium hydroxide was added to the obtained concentrate to adjust pH to 4.2, whereby a post-neutralization solution was separated from a neutralized precipitate. Most of iron contained in the concentrate was distributed to the neutralized precipitate.

A composition of the obtained nickel-cobalt concentrate was Ni 46 g/L, Co 3.1 g/L, and Mn 0.01 g/L.

A weight of the residue was 65 g.

[Solvent Extraction of Nickel-cobalt Concentrate]

The obtained post-neutralization solution was used as an aqueous phase and mixed with a phosphoric ester acid extractant (manufactured by Cyanex, Cyanex 272: Cyanex is a registered trademark) so that a ratio of oil to water was 1, and sodium hydroxide was added thereto to adjust pH to 4.7, followed by mixing and settling by a mixer-settler.

Then, solvent extraction treatment was performed to produce an extraction residual solution containing nickel and a back-extraction solution containing cobalt, by using equipment comprising: three extraction stages, wherein both phases were separated; one washing stage, wherein the obtained organic phase was mixed with a sulfuric acid solution to extract cobalt in the organic phase, while only nickel extracted in the organic phase was back-extracted into the aqueous phase side; and two back-extraction stages, wherein mixing was performed so that a rate of organic phase to aqueous phase was 5, whereby the cobalt extracted in the organic phase was back-extracted.

When the produced extraction residual solution (raffinate) was analyzed using ICP, the composition was Ni 42 g/L, Co<0.01 g/L, and Mn<0.1 g/L. The composition of the back-extraction solution was Ni<0.1 g/L, Co 15.0 g/L, and Mn<0.01 g/L. Thus, it was understood that separation of nickel from cobalt was fully performed.

[Production of Nickel Hydroxide]

A magnesium hydroxide slurry was added to the obtained extraction residual solution to perform an adjustment of pH to 7.3 and neutralization, whereby solid-liquid separation was carried out to obtain nickel in a form of hydroxide. The composition of the obtained nickel hydroxide was Ni: 36.9 wt %, Co: 0.26 wt %, Fe: <0.01 wt %, and Mn: <0.01 wt %.

[Roasting Step]

A total of five samples of the nickel hydroxide of 15 g per sample were taken and each of the samples was put into an alumina crucible. The crucible was put into an electric furnace with an internal volume of 5 liters, and nitrogen gas was flown from a cylinder into a furnace at a flow rate of 0.5 liters per minute to completely substitute an inert atmosphere. Each of the samples was heated to the corresponding one of four temperatures, that is, 250 degrees C., 450 degrees C., 650 degrees C., and 750 degrees C., and maintained for 1 hour, whereby the nickel hydroxide was roasted to be made into a form of nickel oxide.

Figure 4:
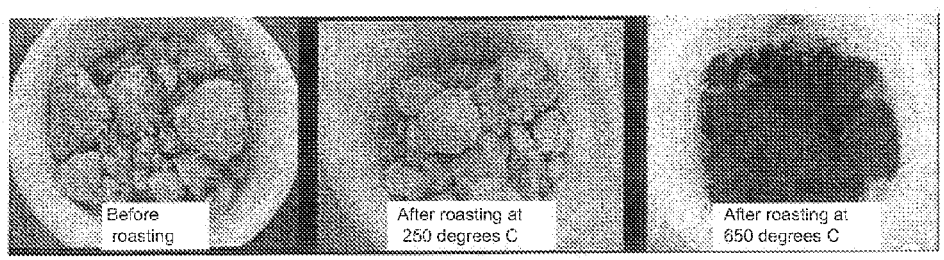
FIG. 4 shows photographs depicting forms of a sample before roasting, after roasting at 250 degrees C., and after roasting at 650 degrees C., in Example 1.

FIG. 4 shows states of the sample before roasting, and after roasting at 250 degrees C., and after roasting at 650 degrees C.

When sulfur in gas which was simultaneously discharged from the furnace was collected by a sodium hydroxide solution to measure a generation amount of sulfur oxide, volatilization of sulfur by roasting, that is, generation of sulfur oxide was not observed.

Figure 5:
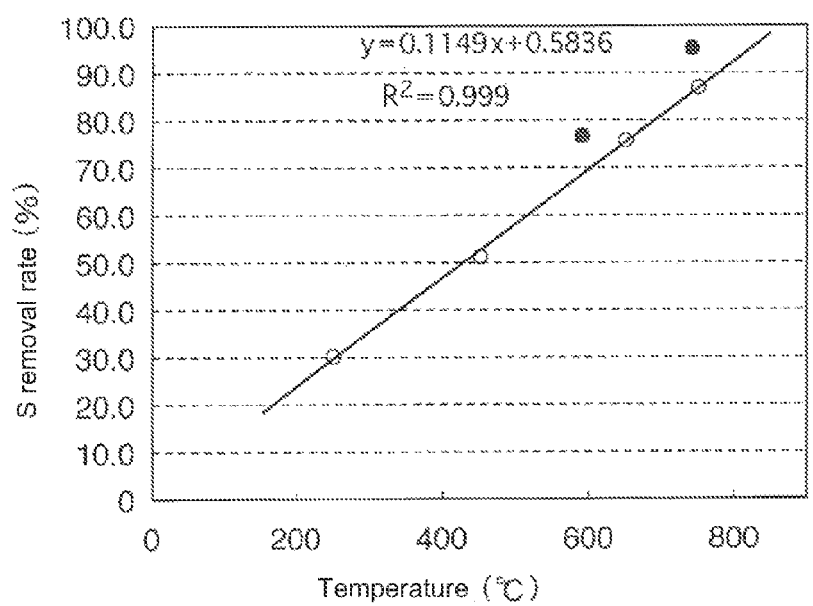
FIG. 5 shows a variation of a sulfur removal rate (S removal rate) accompanying a roasting temperature variation at the time of water-washing a matter obtained after roasting nickel hydroxide with temperature being changed. A black dot represents a value in the case where a mixed sulfide is used as a raw material.

FIG. 5 shows a rate of sulfur removal at the time of water-washing the roasted matters obtained by roasting at each temperature, by warm water of 50 degrees C., and in a roasted matter roasted at higher temperature, a rate of sulfur removal by washing tends to be higher. Note that, in FIG. 5, "○: white circle mark" represents results in a nickel sulfide, and "●: black circle mark" represents results in a mixed sulfide.

When roasting is carried out at 650 degrees C., a rate of sulfur removal can be estimated to be approximately 70%.

When roasting is carried out at 750 degrees C., approximately 90% of sulfur can be removed by water-washing. Furthermore, when roasting is carried out at more than 850 degrees C., it is expected that a rate of sulfur removal is not generally different from that in the case of roasting at not more than 850 degrees C., and therefore it is not necessary to carry out roasting at a temperature exceeding 850 to 870 degrees C. in which sulfur can be completely oxidized.

Furthermore, a 20 g aliquot of sample after desulfurization, the sample being obtained by roasting at 650 degrees C., water-washing, and filtering, was taken and then placed in an alumina tray and maintained at a temperature of 60 degrees C. for 12 hours to be dried. Weighing after drying showed that approximately 17 g of sample was obtained. Furthermore, this sample was kept in a nitrogen atmosphere of 200 degrees C. for 8 hours, it was found that a sample weight did not change, that is, was approximately 17 g, and stable.

[Washing and Calcining Step]

Next, the nickel oxide after roasting, obtained by the above-mentioned step, was recovered, and pure water was added thereto, followed by stirring for 1 hour while keeping at a temperature of 50 degrees C., and then filtering is performed using a 5C filter paper to separate a filtrate from a roasted material after washing (nickel oxide after washing). A particle diameter of the obtained nickel oxide was not more than 1 mm.

When nickel in the filtrate was analyzed by ICP to investigate an elution rate from the nickel oxide, the rate was not more than 0.01%, which means there was hardly elution.

Next, an 80 g aliquot of nickel oxide obtained by roasting at a roasting temperature of 650 degrees C. was taken, and 13 g of coke breeze sieved out to be not more than 1 mm in particle size and 2 g of bentonite produced in Oita prefecture, Japan, were added thereto and kneading is performed without adding water, followed by dividing into ten-odd pieces to produce pellets.

Figure 6:
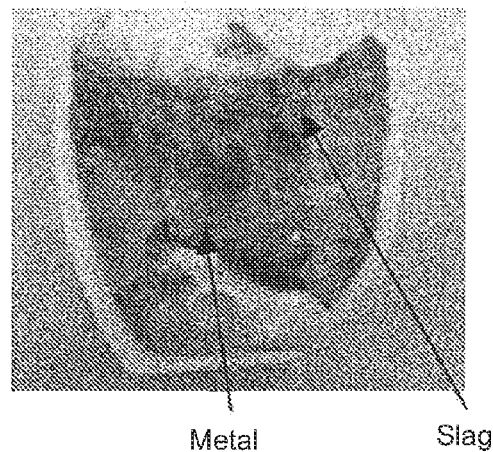
FIG. 6 is a photograph showing a reduced metal and a slag, each being produced from a nickel oxide formed in Example 1.

The produced pellets were placed into an alumina tray, heated and kept at a temperature of 200 degrees C., and maintained for 12 hours. Then, 28 g of the pellets were mixed with 300 g of roasted ore produced by a reduction kiln in the actual ferronickel smelting process and 10 g of coke sieved out to be not more than 1 mm in particle size, and placed into an alumina crucible, then charged into an electric furnace with an internal volume of 5 liters, and heated to a temperature to 1500 degrees C. under an inert atmosphere in which nitrogen gas was flown at a flow rate of 1 liter per minute, and, after the rise in temperature, maintained for 1 hour. After the time elapsed, with the inert atmosphere being kept, cooling was performed to room temperature to recover a slag and a reduced metal in the crucible. FIG. 6 shows the state.

The obtained slag and metal were dissolved with nitric acid, and analyzed using ICP. A sulfur grade in the metal was 0.4%, a distribution ratio of sulfur to the slag was approximately 65%, and a Ni grade in the slag was 0.1%.

Here, for comparison with conventional ferronickel smelting operated using garnierite ore as a raw material, 300 g of the roasted ore produced by a reduction kiln was mixed with 10 g of coke sieved out to be not more than 1 mm in particle size, and placed into an alumina crucible and maintained in an electric furnace under a nitrogen atmosphere at a temperature to 1500 degrees C. for 1 hour to obtain a slag and a reduction metal. A sulfur grade in the metal was 0.4%, and a distribution ratio to the slag was approximately 70%, and thus there was no significant difference from the case of treating the nickel oxide obtained from the nickel oxide ore in the present invention.

From the above, it was confirmed that, with using the method of the present invention, ferronickel was capable of being smelted using nickel hydroxide obtained from a low grade nickel oxide ore as a raw material, instead of the conventional high-grade garnierite ore.

Example 2

By using the same method as in Example 1, a nickel oxide ore was leached with sulfuric acid and sulfurized to form a nickel-cobalt mixed sulfide. A nickel-cobalt concentrate obtained by autoclave dissolution of the obtained mixed sulfide slurry was used as a starting solution.

A composition of the starting solution was such that a nickel concentration was 46 to 118 g/L and a cobalt concentration was 4.1 to 8.4 g/L.

Figure 7:
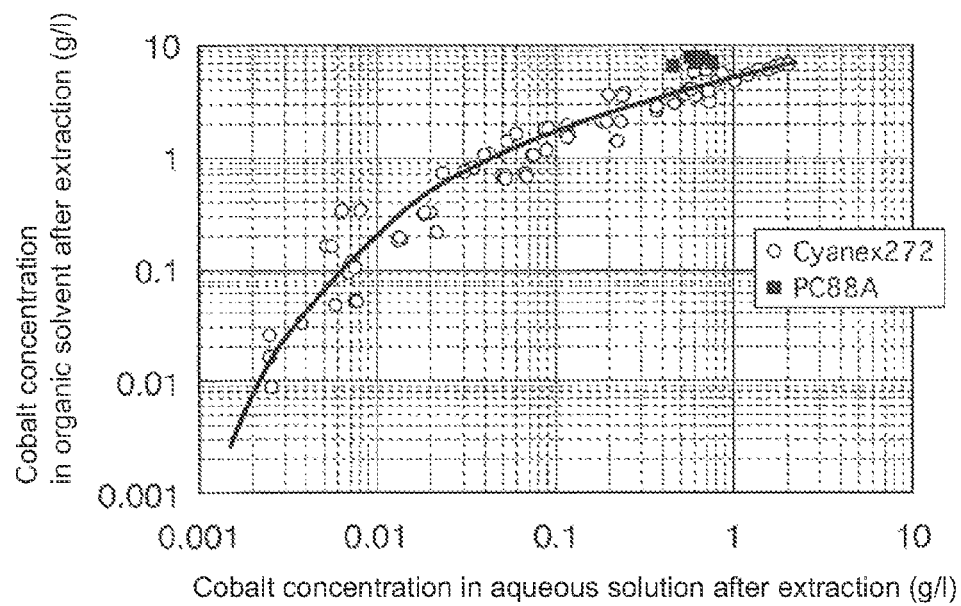
FIG. 7 shows a cobalt concentration in a state where a concentrate containing nickel and cobalt is phase-separated by an organic extractant which is used in Examples.

The nickel-cobalt concentrate was mixed with a phosphonate (phosphate) ester acid extractant (manufactured by DAIHACHI CHEMICAL CO., LTD., product name: PC88A) such that a ratio of oil to water was from 1 to 2, and further 320 g/L of sodium hydroxide aqueous solution was added thereto to adjust pH to 4.5, followed by settling for 5 minutes to perform phase separation. FIG. 7 shows concentrations of cobalt in each phase (an aqueous solution and an organic solvent) in the above-mentioned case, as well as that in the case of "Cyanex272".

Table 1 shows nickel and cobalt concentrations of each solution in one-stage extraction. By the one-stage extraction, a nickel concentration and a cobalt concentration of the aqueous solution after extraction (raffinate) were 44 to 110 g/L and 0.6 to 0.9 g/L, respectively, while a nickel concentration and a cobalt concentration of the organic solvent after extraction were 2.0 to 3.4 g/L and 6.3 to 7.8 g/L, respectively. Thus, excellent separation of nickel from cobalt was observed.

|  | Starting solution for solvent extraction | | Organic solvent after extraction | | Aqueous solution after extraction (raffinate) | |
| --- | --- | --- | --- | --- | --- | --- |
|  | Nickel concentration [g/L] | Cobalt concentration [g/L] | Nickel concentration [g/L] | Cobalt concentration [g/L] | Nickel concentration [g/L] | Cobalt concentration [g/L] |
| PH: 4.5 | 46 | 4.1 | 2.0 | 6.9 | 45 | 0.6 |
|  | 46 | 4.1 | 0.7 | 6.3 | 44 | 0.9 |
|  | 118 | 8.4 | 3.4 | 7.0 | 110 | 0.8 |
|  | 118 | 8.4 | 2.6 | 7.8 | 110 | 0.7 |
|  | 118 | 8.4 | 2.2 | 7.6 | 100 | 0.6 |

Comparative Example 1

The same method as in Example 1 was used, except that an oxidizing atmosphere created by letting air flow into an electric furnace was used as an atmosphere in the roasting step.

A roasting temperature was set to 650 degrees C., and, after the rise in temperature, maintained for 1 hour. In the roasting, sulfur oxide gas generated. Also, sulfur grade in a material obtained after the roasting decreased due to sulfur volatilization. Thus, it was found that a raw material of ferronickel was not obtainable by oxidation roasting performed by air blowing.

The invention claimed is:

1. A method for producing a ferronickel raw material, the method forming the ferronickel raw material from a nickel sulfide or a mixed sulfide containing nickel sulfide and cobalt sulfide, wherein treatments are performed through the following steps:
   (1) a redissolution step, wherein a nickel sulfide or a mixed sulfide of nickel sulfide and cobalt sulfide is made into a slurry, and an oxidizing agent is added to the slurry to obtain a concentrate containing nickel or nickel and cobalt;
   (2) a deferrization step, wherein an alkali is added to the concentrate to obtain a neutralized precipitate and a post-neutralization solution;
   (3) a solvent extraction step, wherein the post-neutralization solution is mixed with an organic extractant to separate into an extracted organic matter and a raffinate, and then a back-extraction solution and an organic matter after back-extraction are obtained from the extracted organic matter;
   (4) a hydroxylation step, wherein alkali is added to the raffinate and mixed to form nickel hydroxide;
   (5) a roasting step, wherein the nickel hydroxide is heated and roasted in a temperature range of not less than 230° C. and not more than 870° C. to form nickel oxide; and
   (6) a washing and calcining step, wherein the nickel oxide is water-washed with water at a temperature of not less than 50° C., and then calcined at a temperature of not less than 50° C. to form a post-washing nickel oxide.

2. The method for producing ferronickel raw material according to claim 1, wherein a particle size of the nickel sulfide or the mixed sulfide is in a range of 15 to 100 μm in mean volume diameter (MV).

3. The method for producing ferronickel raw material according to claim 1, wherein redissolution is performed in a temperature range of not less than 60° C. and not more than 160° C.

4. The method for producing ferronickel raw material according to claim 1, wherein the oxidizing agent is at least one of air, oxygen, a hydrogen peroxide solution, and ozone.

5. The method for producing ferronickel raw material according to claim 1, wherein roasting is performed under an inert atmosphere or an oxygen partial pressure inside a reaction vessel of not more than $10^{-8}$ atm.

6. The method for producing ferronickel raw material according to claim 1, wherein a sulfurizing agent is added to the back-extraction solution to obtain cobalt sulfide.

7. The method for producing ferronickel raw material according to claim 1, wherein soda ash is added to the back-extraction solution to obtain cobalt carbonate.

8. The method for producing ferronickel raw material according to claim 1, wherein alkali is added to the back-extraction solution to obtain cobalt hydroxide.

9. The method for producing ferronickel raw material according to claim 1, wherein a reducing agent and a binder in an amount of 0.1 to 8.0% by weight with respect to the post-washing nickel oxide are added to the post-washing nickel oxide, and kneaded, followed by calcining at a temperature of not less than 50° C. to obtain a nickel oxide pellet.

10. The method for producing ferronickel raw material according to claim 9, wherein the reducing agent is at least one of fine coal, powdered coal, and coke breeze.

11. The method for producing ferronickel raw material according to claim 9, wherein the binder is at least one of bentonite and low grade nickel oxide ore.

12. The method for producing ferronickel raw material according to claim 1, further comprising
   providing the nickel sulfide or the mixed sulfide containing nickel sulfide and cobalt sulfide by high-temperature pressure leaching of a nickel oxide ore using sulfuric acid to form a leachate, neutralizing the leachate, separating into a precipitate containing impurities and a filtrate, adding a sulfurizing agent to the filtrate to separate a zinc sulfide precipitate, and then blowing a sulfurizing agent into a residual filtrate separated from the zinc sulfide.

13. The method for producing ferronickel raw material according to claim 1, further comprising
   providing the nickel sulfide or the mixed sulfide containing nickel sulfide and cobalt sulfide by leaching at least one of nickel hydroxide, nickel oxide, cobalt hydroxide, and cobalt oxide with sulfuric acid to form a leachate, and then blowing a sulfurizing agent into the leachate.

* * * * *